Patented Aug. 5, 1952

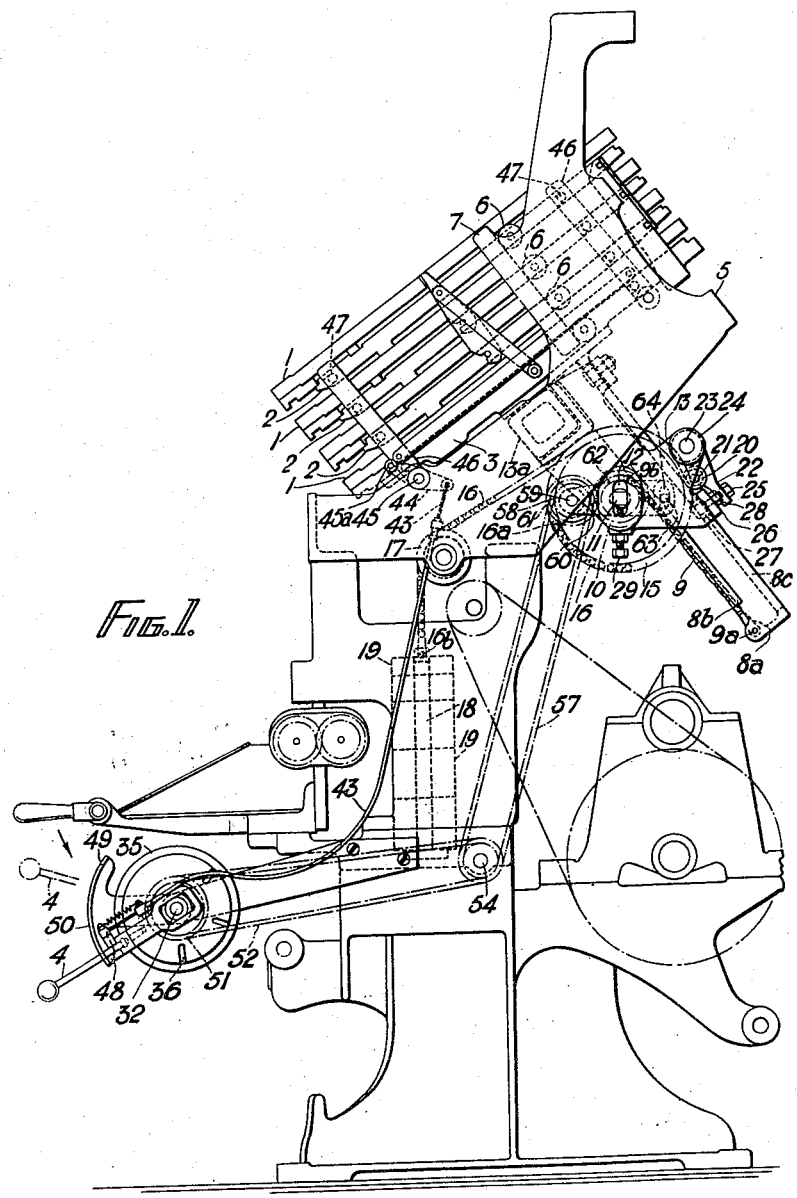

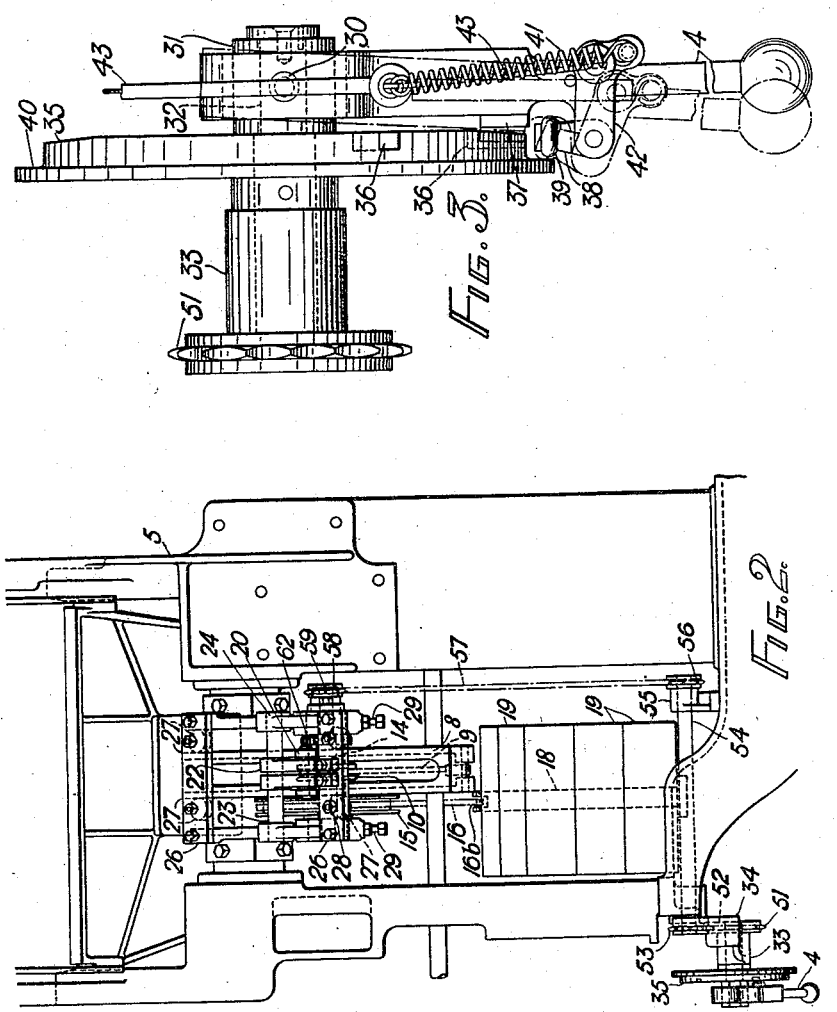

2,605,888

UNITED STATES PATENT OFFICE 2,605,888

MAGAZINE COUNTERBALANCING MECHANISM

Richard Henry Scott, Hale, and Arthur Staniland Hayward, Altrincham, England, assignors to Linotype and Machinery Limited, London, England, a company of Great Britain Application September 18, 1947, Serial No. 774,864
In Great Britain September 28, 1946

7 Claims. (Cl. 199—44)

This invention relates to typographical composing machines such as those known commercially under the registered trade mark "Linotype" wherein a plurality of superposed magazines are adjustable as a whole to bring any desired magazine or magazines into operative position in relation to the assembling and distributing mechanism.

Machines of this kind are provided with means for counterbalancing the weight of the magazines so as to reduce to a minimum the power required for shifting and adjusting the magazines, and such means usually comprise a member tending to turn in one direction under the weight of the magazines and in the opposite direction under the action of a spring or weight.

The present invention is concerned with an improved counterbalancing mechanism, the use of which ensures that the weight of the magazines is uniformly counterbalanced throughout the range of movement thereof, and also ensures that the magazines are correctly guided during such movement.

According to the present invention, a typographical composing machine comprises a plurality of magazines adjustable columnwise to bring a selected magazine into operative position, a rotatable unit having a plurality of circular members of different diameters, means for applying the weight of the magazines to a member or members of relatively small diameter, and means for applying a counterbalancing force to a member or members of relatively larger diameter. The expressions "small" and "larger" are used in a relative sense only to indicate that one member is of less diameter than another.

The weight of the magazines may be applied to a circular member of relatively small diameter by means of a flexible transmission member engaging the periphery thereof and connected thereto at one end, and connected at the other end to a frame supporting the magazines. The counterbalancing force may be applied to a circular member of larger diameter by means of a flexible transmission member engaging the periphery thereof and connected thereto at one end, and connected at the other end to a balance weight. The arrangement according to the invention thus ensures that weight of the adjustable column of magazines is uniformly counterbalanced as the opposing moments exerted about the centre of the rotatable unit by the weight of the magazines on the one hand and the counterbalancing force on the other hand are at all times equal.

The invention also includes means for maintaining the magazine column at an angle of inclination which remains constant during adjustment of the magazine column. Preferably, the magazine column is guided and maintained at a constant angle of inclination by the engagement of an extension of the frame supporting the magazines with a hub formed on the rotatable unit. Adjustable means for holding the extension against the hub and means for controlling sidewise movement of the extension may be included.

The invention further includes means for changing the constant angle of inclination of the magazine column. Preferably, such angle of inclination is changed by altering the position of the rotatable unit. Advantageously, guide members carried by the magazine column and adapted to bear on stationary tracks are included.

One construction according to the invention will now be described by way of example with reference to the accompanying drawings in which:

Figure 1 is a side elevational view of a portion of a typographical composing machine according to the invention;

Figure 2 is a rear elevational view of the typographical composing machine illustrated in Figure 1, and Figure 3 is an enlarged plan view of the hand lever control mechanism looking in the direction indicated by the arrow in Figure 1, the guard plate shown in Figure 1 having been removed.

Referring to Figures 1 and 2 of the drawings, circulating matrices are stored in four magazines 1 carried by base frames 2 which are mounted in a bracket or shift frame 3 to form an adjustable inclined magazine column. Operation of a hand lever 4, through mechanism which is later described, effects adjustment of the shift frame 3 relatively to the machine frame 5 to bring a selected magazine (containing the desired fount of matrices) into operative relationship with distributing mechanism (not shown) at the upper end of the magazine column, and with assembling mechanism (not shown) at the lower end thereof. The magazine column is guided during adjustment by means of ball bearings 6 mounted on the base frames 2 so as to ride on tracks 7 forming part of the machine frame 5.

The shift frame 3 has rigidly secured thereto a downward extension 8 having a foot 8a to which is connected one end 9a of a chain 9. The other end 9b of the chain 9 is fastened to a pulley 10 which is freely mounted on a stationary shaft 11, such shaft being carried by bearings 12 in brackets 13 attached to a cross beam 13a forming part of the machine frame 5. The pulley 10 is formed with a hub 14 which is fixed to a larger pulley 15 also freely mounted on the shaft 11. To the pulley 15 is fastened one end 16a of a chain 16 which is passed around the pulley and over a jockey pulley 17. The other end 16b of the chain is fastened to a weight comprising a carrier bar 18 on which a number of removable weights 19 are supported.

The arrangement of the pulleys 10 and 15 and chains 9 and 16 is therefore such that lowering of the column of magazines or rotation of the pulleys in a clockwise direction, as viewed in Figure 1, causes the chain 16 to be wound around the pulley 15 so raising the weights 19, and the chain 9 to be unwound from the pulley 10 to extend downwardly to the foot 8a, as shown in Figure 1. Similarly, raising of the column of magazines or rotation of the pulleys in an anti-clockwise direction unwinds the chain 16 from around the pulley 15 so lowering the weights 19, and the chain 9 to be wound around the pulley 10.

The weights 19 are of a total value which balances the effective weight of the magazines 1, base frames 2 and shift frame 3. Thus, where the ratio of the diameters of the pulleys 15 and 10 is 3 to 1, and the effective weight of the magazines, base frames and shift frame applied to the pulley 10 is, say 435 lbs., a total counterbalancing weight of 145 lbs. is employed. This arrangement thus enables a counterbalancing weight of a value which is considerably less than the weight of the magazines, base frames and shift frame to be used. Also, the exact counterbalancing of the magazines, base frames and shift frame in any adjusted position is assured as the moments exerted by the opposing weights about the centre of the pulleys are at all times equal.

Variations in the effective weight may occur according to the number or kind of magazines in the column or when a magazine containing a different fount of matrices is substituted for a magazine previously in use. To meet such a variation the total counterbalancing weight may accordingly be adjusted by changing the value or number of the weights 19.

The extension 8 is of frame-like construction and is formed with edges 8b which ride on the hub 14 on either side of the pulley 10 (see Figure 2). As the pulley 10 is connected by chain 9 to the foot 8a of extension 8, the angle of inclination of the magazine column remains constant in all positions of adjustment and the hub 14 assists in guiding the extension 8 and magazine column during such adjustment.

The edges 8b of the extension 8 are held against the hub 14 by rollers 20 bearing on the upper edges 8c of extension 8. The rollers 20 are mounted on studs 21 secured to adjustable arms 22 which are carried by a shaft 23 supported in bearings 24 formed in the brackets 13. Adjustment of the arms 22 is effected by manipulation of bolts 25 which screw into a bridge plate 26 connecting the brackets 13.

Movement sideways of the extension 8 is controlled by four rollers 27 carried by bolts 28 screwed into bridge plates 26 and arranged so that the rollers 27 engage the sides of the extension 8.

The angle of inclination of the magazine column is adjusted by varying the position of the pulley 10 in relation to the extension 8. For this purpose the bearings 12 are of slotted form to allow for adjustment of the position of shaft 11. The shaft 11 seats on two adjusting screws 29 which are screwed into the brackets 13, and by manipulation of screws 29, the position of shaft 11 and pulley 10 can be varied with consequent adjustment of the angle of inclination of the magazine column. Prior to such adjustment, the arms 22 are moved to take the rollers 20 out of contact with the edges 8c of the extension 8 and after the adjustment, the arms 22 are re-adjusted so that the rollers 20 freely revolve while in contact with the edges 8c.

The hand lever 4 may be connected to any suitable mechanism for adjusting the shift frame 3 to bring a selected magazine of the column into operative position. In the construction illustrated in the drawings, the hand lever 4 is operable to impart a rotary movement in either direction to the pulleys 10 and 15 to raise or lower the magazine column. The hand lever 4 is pivotally mounted on studs 30 carried by a sleeve 31 loosely mounted on a shaft 32 which is carried by bearings 33 in a bracket 34 adjustably secured to the machine frame 5. Secured to the shaft 32 is a disc 35 having a number of slots 36. The hand lever 4 is provided with a projection 37 which can be brought into engagement with one of the slots 36 by a pivotal movement of the hand lever about the studs 30.

Pivotally mounted on the side of the hand lever 4 is a lever having an arm 38 provided with a roller 39 which, on sideways movement of the hand lever 4, is brought into engagement with a flange 40 on the disc 35 to turn the arm 38 against the action of a spring 41. The other arm 42 of the lever is connected by means of a flexible cable, such as a "Bowden" wire, 43 to a lever 44 which is pivoted at 45 to the machine frame 5. The lever 44 has secured thereto a stud 45a bearing against a locking arm 46 which engages locating studs 47 on the magazine base frames 2. The sideways movement of the hand lever 4 and consequent turning of the arm 38 thus effects an unlocking movement of the locking arm 46 preparatory to adjustment of the magazine column, and release of the hand lever 4 allows the spring 41 to return the parts to the position in which the magazine column is locked by the locking arms 46.

If the hand lever 4 is in the position indicated by the full lines in Figure 1 when the projection 37 thereon is brought into engagement with a slot 36, the hand lever is raised to the position indicated by broken lines so imparting a clockwise movement to the disc 35. On arriving at the position indicated by broken lines the projection 37 may be disengaged from a slot 36, the hand lever lowered to the position indicated in full lines, and the projection engaged with a succeeding slot 36 to impart a further clockwise movement to the disc. An anti-clockwise movement may be similarly imparted to the disc 35 by engaging the projection 37 with a slot 36 when the hand lever is in the position indicated by broken lines, moving the hand lever downwardly, and disengaging the projection 37 when the hand lever is in the position indicated in full lines. Movement of the hand lever in either direction is limited by stops 48, 49 on a guard plate 50.

The shaft 32 has secured thereto a chain wheel 51 which is connected by means of an endless chain 52 to a chain wheel 53 secured at one end of a shaft 54 mounted in bearings 55 in the machine frame. To the other end of the shaft 54 is secured a chain wheel 56 which is connected by means of an endless chain 57 to a chain wheel 58 secured to a shaft 59 carried by an adjustable arm 60. Secured to the arm 60 is a spur gear wheel 61 meshing with a spur gear wheel 62 which is integral with the pulley hub 14. The arm 60 is loosely mounted on the shaft 11 and is held (in a position which is adjustable in accordance with the position of shaft 11 and pulley hub 14) by a bolt 63 passing through a slot 64 in the arm 60 and screwing into a bracket 13. Thus, a rotary movement of the hand lever 4 and disc 35 is imparted to the pulleys 10 and 15 to raise or lower the magazine column.

The invention has been described and illustrated as applied to the main magazines of a typographical composing machine. It will be understood, however, that the invention is also applicable to the auxiliary magazines which are sometimes employed in a typographical composing machine.

We claim:

1. A typographical composing machine including in combiantion a plurality of magazines adjustable columnwise to bring a selected magazine into operative position, a frame supporting the magazines, a downward extension secured to the frame, a flexible transmission member secured at one end to the extension, a relatively small pulley to which the other end of the flexible transmission member is secured so that said flexible transmission member engages said pulley and tends to turn it in one direction, a pulley of larger diameter, a hub connecting the pulley of larger diameter to the small pulley, a shaft on which the hub is mounted, a second flexible transmission member secured at one end to the pulley of larger diameter and engaging said pulley and so tending to turn it in the opposite direction and a counterbalancing weight connected to the other end of the second flexible transmission member so as to turn the pulleys in the opposite direction.

2. A combination according to claim 1 including edges formed on the downward extension and riding on the pulley hub on either side of the small pulley.

3. A combination according to claim 2 including rollers mounted on adjustable arms and bearing on the downward extension so as to hold the edges against the pulley hub.

4. A combination according to claim 3 including rollers engaging the sides of the extension to control sidewise movement thereof.

5. A typographical composing machine including in combination a plurality of magazines adjustable columnwise to bring a selected magazine into operative position, a frame supporting the magazines, a downward extension secured to the frame, a flexible transmission member secured at one end to the extension, a relatively small pulley to which the other end of the flexible transmission member is secured so that said flexible transmission member engages said pulley and tends to turn it in one direction, a pulley of larger diameter, a hub connecting the pulley of larger diameter to the small pulley, a shaft on which the hub is mounted, a second flexible transmission member secured at one end to the pulley of larger diameter and engaging said pulley and so tending to turn it in the opposite direction, a counterbalancing weight connected to the other end of the second flexible transmission member so as to turn the pulleys in the opposite direction, slotted bearings carrying the shaft on which the pulley hub is mounted and adjusting screws on which the shaft is seated.

6. A combination according to claim 5 including a carrier bar on which a plurality of removable weights are supported.

7. A typographical composing machine including in combination a plurality of magazines adjustable columnwise to bring a selected magazine into operative position, guide members carried by the magazine column, stationary tracks on which the guide members are adapted to bear, a rotatable force transmitting unit comprising a hub having a plurality of circular members of different diameters to exert different but uniform torque values in all adjusted positions of the magazines, a frame supporting the magazines, an extension of the frame engaging the rotatable hub, a flexible transmission member secured at one end to the extension and at its other end to a circular member of relatively small diameter so tending to turn the said hub in one direction, a second flexible transmission member secured at one end to a circular member of larger diameter, a counterbalancing weight secured to the other end of the second flexible transmission member, and adapted to turn the hub in the opposite direction, and adjustable means for holding the extension against the hub.

RICHARD HENRY SCOTT.
ARTHUR STANILAND HAYWARD.

REFERENCES CITED

The following references are of record in the file of this patent:

UNITED STATES PATENTS

| Number | Name | Date |
| --- | --- | --- |
| 1,116,620 | Pearce et al. | Nov. 10, 1914 |
| 1,116,489 | Rogers | Nov. 10, 1914 |
| 2,307,071 | Plastaras | Jan. 5, 1943 |
| 2,333,239 | Fleisher | Nov. 2, 1943 |

FOREIGN PATENTS

| Number | Country | Date |
| --- | --- | --- |
| 424,705 | Germany | Jan. 29, 1926 |
| 211,969 | Britain | Mar. 3, 1924 |

OTHER REFERENCES

Mechanics of Machinery by Heck 1923; published by McGraw-Hill Book Co. Inc., 370 Seventh Ave. New York city, pg. 222.